(12) United States Patent
Hatano et al.

(10) Patent No.: US 6,825,275 B2
(45) Date of Patent: Nov. 30, 2004

(54) RUBBER COMPOSITION FOR ADHERING TO STEEL CORDS

(75) Inventors: Seiji Hatano, Osaka (JP); Hirofumi Hayashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/864,778

(22) Filed: May 24, 2001

(65) Prior Publication Data

US 2004/0044140 A1 Mar. 4, 2004

(30) Foreign Application Priority Data

Jul. 24, 2000 (JP) ........................................ 2000-222592

(51) Int. Cl.⁷ .................................................. C08F 8/00
(52) U.S. Cl. ........................ 525/133; 525/17; 525/122; 525/349
(58) Field of Search ........................ 525/133, 17, 122, 525/349

(56) References Cited

U.S. PATENT DOCUMENTS 5,226,987 A * 7/1993 Matsumoto et al. ..... 152/209.5

FOREIGN PATENT DOCUMENTS

| JP | 63-221140 | * | 9/1988 |
| JP | 06329839 | | 11/1994 |
| JP | 06329840 | | 11/1994 |
| JP | 11060820 | | 3/1999 |
| JP | 11246835 | | 9/1999 |
| JP | 11263954 | | 9/1999 |

* cited by examiner

Primary Examiner—Ling Siu Choi
(74) Attorney, Agent, or Firm—Jordan and Hamburg LLP

(57) ABSTRACT

A rubber composition for adhering to steel cords, having excellent heat-resistant adhesion and moist heat-resistant adhesion, as well as initial adhesion, and performance at a level comparable to or higher than that of the related art in resistance to rubber fracture, is made from components (A) and (B), which are blended to 100 weight parts of rubber components containing natural rubber and/or diene synthetic rubber, wherein component (A) is a mixture of a compound containing nickel and a compound containing molybdenum; or a compound containing nickel and molybdenum simultaneously, in a metal-converted amount of 0.01 to 10 weight parts; and component (B) is a mixture of (b1), which is 0.2 to 20 weight parts of hexamethylenetetramine or a melamine derivative, and (b2), which is 0.1 to 10 weight parts of at least one selected from the group consisting of phenol resins, resorcin, resorcin derivatives, and cresol resins.

20 Claims, No Drawings

RUBBER COMPOSITION FOR ADHERING TO STEEL CORDS

BACKGROUND OF THE INVENTION

1. Field of the Invention

The present invention relates to a rubber composition for adhering to steel cords.

2. Description of the Related Art

In order to increase the adhesive force of rubber to steel cords plated with brass, bronze, or zinc, a cobalt salt of an organic acid has heretofore been exclusively used. A technique involving blending of the cobalt salt of an organic acid with a rubber composition to promote the formation of an adhesive interface layer onto steel cords, thus increasing the adhesive force, is known in the art.

In recent years, problems have occurred, such as deterioration in adhesive force caused by high exothermic heat accompanied by higher operating speeds and greater horespower of vehicles, deterioration in adhesive force caused by heat, accompanied by prolonged tire life, or deterioration in adhesive force caused by moisture and heat over a period of time between manufacture and use, thus requiring adhesive properties of a higher level.

Although cobalt is excellent in initial adhesion, heat deterioration (heat aging) causes serious deterioration in adhesive force as described above. Even the use of cobalt can no longer alone satisfy the needs for the high level of adhesion performance required in recent years. It is probable that cobalt is a strong oxidation promoter, and the action thereof to promote the formation of an adhesive layer causes an increase in the thickness of the adhesive layer during travel to lead to fracture of the rubber layer.

Moreover, cobalt is a rare metal, and countries producing the raw material have had problems with political stability. Accordingly, the use of cobalt is disadvantageous because of high fluctuation in price and an unstable supply of rubber products.

SUMMARY OF THE INVENTION

The invention has been made under the aforesaid circumstances. An object of the invention is to provide a rubber composition for adhering to steel cords, which has excellent heat-resistant adhesion and moist heat-resistant adhesion, as well as excellent initial adhesion and performance at a level comparable to or higher than that in the related art, as to resistance to rubber fracture.

The rubber composition for adhering to steel cords according to embodiments of the present invention demonstrates excellent adhesion to steel cords. The rubber composition is prepared by adding the following components (A) and (B) to 100 weight parts of a rubber component containing natural rubber and/or a diene synthetic rubber.

(A) A mixture of a compound containing nickel, and a compound containing molybdenum; or a compound containing simultaneously nickel, and molybdenum in a metal-converted amount of 0.01 to 10 weight parts. (B) (b1) 0.2 to 20 weight parts of hexamethylenetetramine or a melamine derivative, and (b2) 0.1 to 10 weight parts of at least one selected from the group consisting of phenol resins, resorcin, resorcin derivatives, and cresol resins.

A composition according to certain embodiments of the present invention is prepared by further adding a compound containing calcium (C) to the foregoing composition.

The composition according to those embodiments of the present invention is prepared by adding the aforesaid compound containing calcium (C) in an amount of 0.1 to 20% in weight ratio to the aforesaid component (A) of the basic composition. Compositions according to still other embodiments of the present invention are prepared by further adding silica (D) to the basic composition or to the calcium-containing composition.

These silica-containing compounds are prepared by adding 1 to 100 weight parts of the aforesaid silica (D) to 100 weight parts of the rubber component of the basic or calcium-containing compositions.

The invention provides a rubber composition for adhering to steel cords which has excellent heat-resistant adhesion and excellent moist heat-resistant adhesion, as well as excellent initial adhesion and performance at a level comparable to or higher than that in the related art, as to resistance to rubber fracture.

DETAILED DESCRIPTION OF THE INVENTION

Rubber Components

Examples of rubber components used in the invention include natural rubber and synthetic rubber such as polyisoprene rubber (IR), polybutadiene rubber (BR), styrene-butadiene rubber (SBR), isoprene-isobutylene rubber (IIR), ethylene-propylene-diene rubber (EPDM), and modified rubber thereof. These can be used singly or as a mixture of two or more thereof.

Component (A)

The compound containing nickel, and the compound containing molybdenum are both either an inorganic compound or an organic compound, respectively.

Inorganic compounds include nickel oxide, and molybdenum oxide; nickel sulfate, and molybdenum sulfate; nickel phosphate, and molybdenum phosphate; nickel phosphite, and molybdenum phosphite; nickel carbonate, and molybdenum carbonate; and nickel chloride, and molybdenum chloride.

Organic compounds include nickel salts, and molybdenum salts of organic acids; and an organonickel sulfur compound, an organomolybdenum sulfur compound.

Preferred nickel salts of organic acids are nickel naphthenate, nickel octylate, nickel propionate, nickel abietate, and nickel acetate in view of excellent adhesion performance.

Preferred molybdenum salts of organic acids are molybdenum naphthenate and/or molybdenum abietate in view of excellent adhesion performance.

In component (A), a Ni/Mo ratio (weight converted to metals) is not particularly limited, but preferably is from 2/1 to 20/1. The ratio less than 2/1 may invite problems of being uneconomical (Mo is very costly as compared with Ni) and decreasing hardness (rigidity) of the resulting rubber. Exceeding 20/1 may cause a problem of being unable to acquire sufficient adhesion (Ni cannot compensate for deterioration in adhesion).

In these salts of organic acids, it also is possible to blend organic acids. For example, adhesion, particularly moist heat adhesion is preferably improved when component (A) is a mixture of nickel salts of naphthenic acid and octylic acid (naphthenic acid/octylic acid=1/1 to 1/4 in weight percent) and a molybdenum salt of naphthenic acid.

Naphthenic acid is preferred because the high acid value of, for example, 250 mgKOH/g or more, further improves the adhesion, particularly the heat-resistant adhesion.

Component (B)

Component (B) includes combination of the following components (b1) and (b2).

(b1) hexamethylenetetramine or melamine derivatives.

(b2) at least one selected from the group consisting of phenol resins, resorcin, resorcin derivatives, and cresol resins.

An example of the melamine derivatives is hexamethoxymethylmelamine.

Examples of the resorcin derivatives include resorcin/alkylphenol/formalin copolymers and resorcin/formalin reaction products.

Component (B) is used to markedly improve the adhesion, particularly the initial adhesion.

Component (C)

Use of compounds containing calcium (C) is preferred because of further improving the adhesion, particularly heat-resistant adhesion.

Examples of compounds containing calcium (C) include calcium borate and calcium neodecanoate, but are not limited to these salts.

Compounds containing calcium (C) are preferably added to component (A) during the preparation thereof on the grounds that an effect of improving the hardness (rigidity) of the resulting rubber can be acquired (When component (C) is added to rubber singly apart from component (A), such effect is not obtained).

Component (D)

Addition of silica (component (D)) further improves the adhesion. Silica used include dry process silica (silicic acid anhydride) and wet process silica (hydrated silicic acid), but are not thus limited.

Carbon Black

Carbon black usable in the invention is generally unlimited, and include carbon blacks classified according to the classification by ASTMD1765, including SAF class having numbers of 100's, ISAF class having numbers of 200's, and HAF class having numbers of 300's which have a high reinforcing action, and particularly include N110, N121, N219, N220, N231, N330, and N339. These can be used singly or as a mixture of two or more thereof.

Blend Ratios of Principal and Other Components

The ratio of component (A) blended is from 0.01 to 10 weight parts (in conversion to metal) to 100 weight parts of the rubber component. The ratio of component (A) less than 0.01 weight part invites a problem of failing to obtain sufficient initial adhesion. Exceeding 10 weight parts results in promoting oxidative deterioration of rubber by metal and decreasing aging resistance of the rubber, and as a result offers a problem of decreasing adhesion after aging. The range is preferably from 0.01 to 5.0 weight parts, and more preferably from 0.01 to 2.0 weight parts (in conversion to metal).

In component (B), the ratio of component (b1) blended is from 0.2 to 20 weight parts to 100 weight parts of the rubber component. The ratio of component (b2) blended is from 0.1 to 10 weight parts to 100 weight parts of the rubber component (The ratio varies depending upon purposes and kinds of resins used and cannot be unconditionally determined). When the ratio of component (b1) blended is less than 0.2 weight part or the ratio of component (b2) is less than 0.1 weight part to 100 weight parts of the rubber component, an effect of improving the adhesion cannot be sufficiently achieved. The ratio of component (b1) blended exceeding 20 weight parts or the ratio of component (b2) exceeding 10 weight parts makes the rubber resinous and fragile. Herein, a preferred range of component (b1) is from 0.5 to 10 weight parts, and that of component (b2) is from 0.5 to 5.0 weight parts.

The ratio of a compound containing calcium (C) blended is from 0.1 to 20 percent in weight ratio to component (A). The ratio of component (c) blended is less than 0.1 weight percent fails to achieve sufficient improvement in heat-resistant adhesion whereas exceeding 20 weight percent makes it difficult to prepare component (A). Herein, a preferred range is from 1 to 10 weight percent.

The ratio of sulfur blended is not particularly limited, and for example, from 1 to 10 weight percent.

EXAMPLES

The invention is illustrated through examples, but is not to be construed as limited by the examples.

Examples and Comparative Examples

Common components as described in the following "table 1" and respective components as described in the following "tables 2 to 4" were blended in ratios as described in the tables. Thereafter, these components were kneaded by use of a Banbury mixer according to a general procedure to prepare rubber compositions. About the resulting rubber compositions, an adhesion test (initial adhesion, heat-resistant adhesion, moist heat-resistant adhesion) and an aging resistance test were carried out and evaluated. The respective procedures of evaluation are as follows:

(1) Adhesion Test

Steel cords plated with brass were arranged at intervals of 12 lengths/25 mm and separated by seating rubber to be evaluated. Two sheets of such rubber were piled and vulcanized at 150° C. for 30 min to prepare a sample. Peel force of the sample of 25-mm width was measured by use of an autograph. A covering ratio by the steel cord rubber was evaluated by inspection with the naked eye.

The initial adhesion, heat-resistant adhesion, and moist heat-resistant adhesion were evaluated (Heat-resistant adhesion: undergoing aging in a 160° C. oven to evaluate adhesion. Moist heat-resistant adhesion: A sample is placed in an autoclave containing water and subjected to aging in a 105° C. oven to evaluate adhesion). Results of measurements were estimated by indexes based on the results of Comparative Example 1 estimated as 100 and described in Tables 2 to 4.

(2) Aging Resistance Test

After aging in a Geer oven (after aging a sample in the 90° C. oven), a tensile test was carried out (according to JIS K6253). Retention degrees of breaking extension to the initial value were represented by indexes based on the result of Comparative Example 1 estimated as 100. Resulted are described in Tables 2 to 4.

TABLE 1

| Natural Rubber | 100 parts |
|---|---|
| Carbon Black (HAF) | 60 parts |
| Zinc White | 8 parts |
| Aging Preventive (6C) | 2 parts |
| Insoluble Sulfur | 6 parts |
| Promoter (DZ) | 1 part |

TABLE 2

| | Comparative Example | | | | |
|---|---|---|---|---|---|
| | 1 | 2 | 3 | 4 | 5 |
| Cobalt Stearate | ○ | | | | |
| Ni/Mo Sample 1*[1] | | | | | |
| Ni/Mo Sample 2*[2] | | | | | |

TABLE 2-continued

|  | Comparative Example | | | | |
|---|---|---|---|---|---|
|  | 1 | 2 | 3 | 4 | 5 |
| Ni/Mo Sample 3*[3] |  | ○ |  | ○ | ○ |
| Ni/Mo Sample 4*[4] |  |  |  |  |  |
| Ni/Mo Sample 5*[5] |  |  |  |  |  |
| Ni/Mo Sample 6*[6] |  |  |  |  |  |
| Ni/Mo Sample 7*[7] |  |  |  |  |  |
| Ni/Mo Sample 8*[8] |  |  |  |  |  |
| Amount of the aforesaid Metallic Compound Blended to 100 Parts of Rubber Component (Amount Converted to Metal) (Part) | 0.2 | 0.2 |  | 0.005 | 15 |
| SUMIKANOL 620 (Sumitomo Chemical Co., Ltd.)*[9] | 2 |  | 2 | 2 | 2 |
| SCILETTU 963L (Mitsul Scitech)*[10] | 4 |  | 4 | 4 | 4 |
| Initial Adhesion |  |  |  |  |  |
| Peel Force | 100 | 82 | 76 | 73 | 101 |
| Covering Ratio of Rubber | 100 | 100 | 100 | 100 | 100 |
| Heat-Resistant Adhesion (160° C. × 96 h age) |  |  |  |  |  |
| Peel Force | 100 | 75 | 88 | 110 | 82 |
| Covering Ratio of Rubber | 50 | 50 | 60 | 90 | 60 |
| Moist Heat Adhesion (105° C. × 96 h steam age) |  |  |  |  |  |
| Peel Force | 100 | 83 | 105 | 106 | 88 |
| Covering Ratio of Rubber | 10 | 10 | 10 | 10 | 5 |
| Aging Resistance (90° C. × 192 h age) |  |  |  |  |  |
| Degree of Improvement | 100 | 106 | 110 | 127 | 85 |

TABLE 3

|  | Example | | | | | |
|---|---|---|---|---|---|---|
|  | 1 | 2 | 3 | 4 | 5 | 6 |
| Cobalt Stearate |  |  |  |  |  |  |
| Ni/Mo Sample 1*[1] | ○ |  |  |  |  |  |
| Ni/Mo Sample 2*[2] |  | ○ |  |  |  |  |
| Ni/Mo Sample 3*[3] |  |  | ○ |  |  |  |
| Ni/Mo Sample 4*[4] |  |  |  | ○ |  |  |
| Ni/Mo Sample 5*[5] |  |  |  |  | ○ |  |
| Ni/Mo Sample 6*[6] |  |  |  |  |  | ○ |
| Ni/Mo Sample 7*[7] |  |  |  |  |  |  |
| Ni/Mo Sample 8*[8] |  |  |  |  |  |  |
| Amount of the aforesaid Metallic Compound Blended to 100 Parts of Rubber Component (Amount Converted to Metal) (Part) | 0.2 | 0.2 | 0.2 | 0.2 | 0.2 | 0.2 |
| SUMIKANOL 620 (Sumitomo Chemical Co., Ltd.)*[9] | 2 | 2 | 2 | 2 | 2 | 2 |
| SCILETTU 963L (Mitsul Sciteck)*[10] | 4 | 4 | 4 | 4 | 4 | 4 |
| Initial Adhesion |  |  |  |  |  |  |
| Peel Force | 111 | 114 | 116 | 115 | 111 | 117 |
| Covering Ratio of Rubber | 100 | 100 | 100 | 100 | 100 | 100 |
| Heat-Resistant Adhesion (160° C × 96 h age) |  |  |  |  |  |  |
| Peel Force | 93 | 98 | 100 | 99 | 100 | 96 |
| Covering Ratio of Rubber | 80 | 80 | 90 | 80 | 70 | 90 |
| Moist Heat-resistant Adhesion (105° C. × 96 h steam age) |  |  |  |  |  |  |
| Peel Force | 106 | 104 | 105 | 104 | 106 | 99 |
| Covering Ratio of Rubber | 20 | 15 | 10 | 10 | 10 | 20 |
| Aging Resistance (90° C × 192 h age) |  |  |  |  |  |  |
| Degree of Improvement | 113 | 112 | 111 | 112 | 111 | 100 |

TABLE 4

|  | Example | | | | | | |
|---|---|---|---|---|---|---|---|
|  | 7 | 8 | 9 | 10 | 11 | 12 | 13 |
| Cobalt Stearate |  |  |  |  |  |  |  |
| Ni/Mo Sample 1*[1] |  |  |  |  |  |  |  |
| Ni/Mo Sample 2*[2] |  |  |  |  |  |  |  |
| Ni/Mo Sample 3*[3] |  |  | ○ | ○ | ○ | ○ | ○ |
| Ni/Mo Sample 4*[4] |  |  |  |  |  |  |  |
| Ni/Mo Sample 5*[5] |  |  |  |  |  |  |  |
| Ni/Mo Sample 6*[6] |  |  |  |  |  |  |  |
| Ni/Mo Sample 7*[7] | ○ |  |  |  |  |  |  |
| Ni/Mo Sample 8*[8] |  | ○ |  |  |  |  |  |
| Amount of the aforesaid Metallic Compound Blended to 100 Parts of Rubber Component (Amount Converted to Metal) (Part) | 0.2 | 0.2 | 0.2 | 0.2 | 0.2 | 0.2 | 0.2 |
| SUMIKANOL 620 (Sumitomo Chemical Co., Ltd.)*[9] | 2 | 2 | 8 |  |  | 2 | 2 |
| Resorcin/Formalin Reaction Product PENACOLITE RESIN B19-S (Indospech Co.) |  |  |  |  | 2 |  |  |
| Resorcin (Sumitomo Chemical Co., Ltd.) |  |  |  |  |  | 2 |  |
| SCILETTU 963L (Mitsui Scitech)*[12] | 4 | 4 | 10 | 4 | 4 |  | 4 |

TABLE 4-continued

|  | Example | | | | | | |
|---|---|---|---|---|---|---|---|
|  | 7 | 8 | 9 | 10 | 11 | 12 | 13 |
| Hexamethylenetetramine |  |  |  |  |  | 4 |  |
| NOXELER H (Ouchl Shinko Kagaku K.K.) |  |  |  |  |  |  |  |
| Silica (NIPSEAL AQ, Nippon Silica K.K.) |  |  |  |  |  |  | 10 |
| Initial Adhesion |  |  |  |  |  |  |  |
| Peel Force | 105 | 114 | 116 | 114 | 118 | 114 | 105 |
| Covering Ratio of Rubber | 100 | 100 | 100 | 100 | 100 | 100 | 100 |
| Heat-Resistant Adhesion |  |  |  |  |  |  |  |
| (160° C. × 96 h age) |  |  |  |  |  |  |  |
| Peel Force | 99 | 104 | 114 | 102 | 98 | 98 | 97 |
| Covering Ratio of Rubber | 80 | 70 | 90 | 90 | 90 | 90 | 90 |
| Moist Heat-Resistant Adhesion |  |  |  |  |  |  |  |
| (105° C. × 96 h steam age) |  |  |  |  |  |  |  |
| Peel Force | 91 | 95 | 127 | 103 | 107 | 103 | 100 |
| Covering Ratio of Rubber | 30 | 10 | 30 | 10 | 10 | 15 | 40 |
| Aging Resistance (90° C. × 192 h age) |  |  |  |  |  |  |  |
| Degree of Improvement | 113 | 107 | 111 | 113 | 109 | 111 | 110 |

*1) Ni naphthenate/Mo naphthenate (Ni/Mo=2/1 (mole ratio))
*2) Ni naphthenate/Mo naphthenate (Ni/Mo=4/1 (mole ratio))
*3) Ni naphthenate/Mo naphthenate (Ni/Mo=6/1 (mole ratio))
*4) Ni naphthenate/Mo naphthenate (Ni/Mo=8/1 (mole ratio))
*5) Ni naphthenate/Mo naphthenate (Ni/Mo=20/1 (mole ratio))
*6) Ni naphthenate/Mo naphthenate of high acid value (300 mgKOH/g) (Ni/Mo =6/1 (mole ratio))
*7) (Ni octylate+Ni naphthenate [octylic acid: naphthenic acid=7:3])/Mo naphthenate (Ni/Mo=6/1 (mole ratio))
*8) Ni naphthenate/Mo naphthenate (Ni/Mo=6/1 (mole ratio)) and Ca borate at a weight ratio of 2%
*9) Resorcin/alkylphenol/formalin copolymer resin
* 10) Hexamethoxymethylmelamine

What is claimed is:

1. A rubber composition for adhering to steel cords, comprising:
    a rubber;
    (A) one of:
        a mixture of a nickel metal-containing compound and a molybdenum metal-containing compound; and
        a compound containing both nickel and molybdenum metals; and
    (B) a mixture of:
        (b1) one of hexamethylenetetramine and a metamine derivative, in an amount of 0.2 to 20 parts by weight per 100 parts by weight of rubber; and
        (b2) at least one compound selected from the group consisting of phenol resins, resorcin, resorcin derivatives, and cresol resins, in an amount of 0.1 to 10 parts by weight per 100 parts by weight of rubber;
    such that (A), on an equivalent metal weight basis, and (B), together, are present in an amount of 0.01 to 10parts by weight per 100 parts by weight of rubber; and
    (C) a calcium-containing compound.

2. The composition according to claim 1, wherein said rubber is one of a natural rubber, a diene synthetic rubber, and mixtures thereof.

3. The composition according to claim 1, wherein said calcium-containing compound is present in an amount of 0.1% to 20% by weight, of the weight of (A).

4. The composition according to claim 1, further comprising a silica.

5. The composition according to claim 4, wherein said silica is present in an amount of 1 to 100 parts by weight per 100 parts by weight of rubber.

6. The composition according to claim 1, wherein said rubber is selected from the group consisting of: polyisoprene rubber (IR), polybutadiene rubber (BR), styrene-butadiene rubber (SBR), isoprene-isobutylene rubber (IIR), ethylene-propylene-diene rubber (EPDM); and mixtures of the foregoing.

7. The composition according to claim 1, wherein the nickel-containing compound, the molybdenum-containing compound, and the nickel and molybdenum-containing compound are each individually an inorganic compound or an organic compound.

8. The composition according to claim 1, wherein the nickel-containing compound is selected from the group consisting of:
    nickel oxide; nickel sulfate; nickel phosphate; nickel phosphite; nickel carbonate; nickel chloride; nickel salts of organic acids; organonickel sulfur compounds; and mixtures thereof.

9. The composition according to claim 1, wherein the molybdenum-containing compound is selected from the group consisting of:
    molybdenum oxide; molybdenum sulfate; molybdenum phosphate; molybdenum phosphite; molybdenum carbonate; molybdenum chloride; molybdenum salts of organic acids; organomolybdenum sulfur compounds; and mixtures thereof.

10. The composition according to claim 8, wherein said nickel salt of an organic acid is selected from the group consisting of: nickel naphthenate; nickel octylate; nickel propionate; nickel abietate; nickel acetate; and mixtures thereof.

11. The composition according to claim 9, wherein said molybdenum salt of an organic acid is selected from the group consisting of: molybdenum naphthenate; molybdenum abietate; and mixtures thereof.

12. The composition according to claim 1, wherein said calcium-containing compound is selected from the group consisting of: calcium borate; and calcium neodecanoate.

13. The composition according to claim 2, wherein said silica is selected from the group consisting of: silicic acid anhydride; and hydrated silicic acid.

14. The composition according to claim 1, further comprising carbon black.

15. The composition according to claim 14, wherein said carbon black is selected from the group consisting of carbon black classified according to ASTMD 1765, having a class number of:
   SAF class: 100 series;
   ISAF class: 200 series;
   HAF class: 300 series; and
   mixtures of the foregoing.

16. The composition according to claim 14, wherein said carbon black is selected from the group consisting of carbon blacks having ASTMD 1765 classes: N110; N121; N219; N220; N231; N330; N339; and mixtures of the foregoing.

17. The composition according to claim 4, further comprising carbon black.

18. The composition according to claim 17, wherein said carbon black is selected from the group consisting of carbon black classified according to ASTMD 1765, having a class number of:
   SAF class: 100 series;
   ISAF class: 200 series;
   HAF class: 300 series; and
   mixtures of the foregoing.

19. The composition according to claim 17, wherein said carbon black is selected from the group consisting of carbon blacks having ASTMD 1765 classes: N110; N121; N219; N220; N231; N330; N339; and mixtures of the foregoing.

20. A rubber composition for adhering to steel cords, comprising:
   a rubber;
   (A) one of:
      a mixture of a nickel metal-containing compound and a molybdenum metal-containing compound; and
      a compound containing both nickel and molybdenum metals; and
   (B) a mixture of:
      (b1) one of hexamethylenetetramine and a melamine derivative, in an amount of 0.2 to 20 parts by weight per 100 parts by weight of rubber; and
      (b2) at least one compound selected from the group consisting of phenol resins, resorcin, resorcin derivatives, and cresol resins, in an amount of 0.1 to 10 parts by weight per 100 parts by weight of rubber;
   such that (A), on an equivalent metal weight basis, and (B), together, are present in an amount of 0.01 to 10 parts by weight per 100 parts by weight of rubber;
   (C) a calcium-containing compound; and (D) a silica.

* * * * *